Sept. 9, 1952 W. A. DEXHEIMER, JR., ET AL 2,609,740
REVERSIBLE TRACTOR PLOW
Filed Jan. 10, 1946 3 Sheets-Sheet 1

Inventors
Walter A. Dexheimer, Jr.
Harold N. Pullen

By Clarence A. O'Brien
and Harvey B. Jacobson
Attorneys

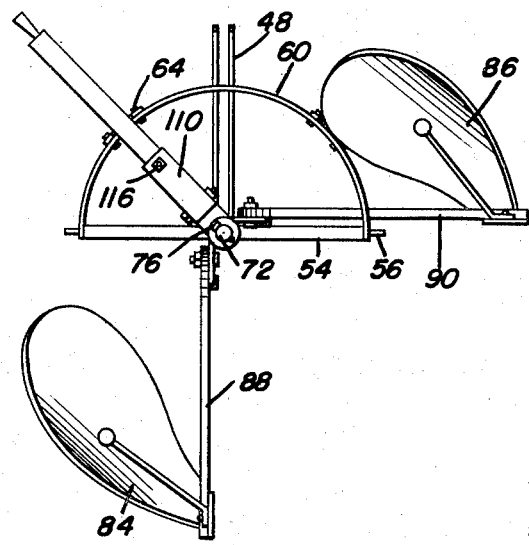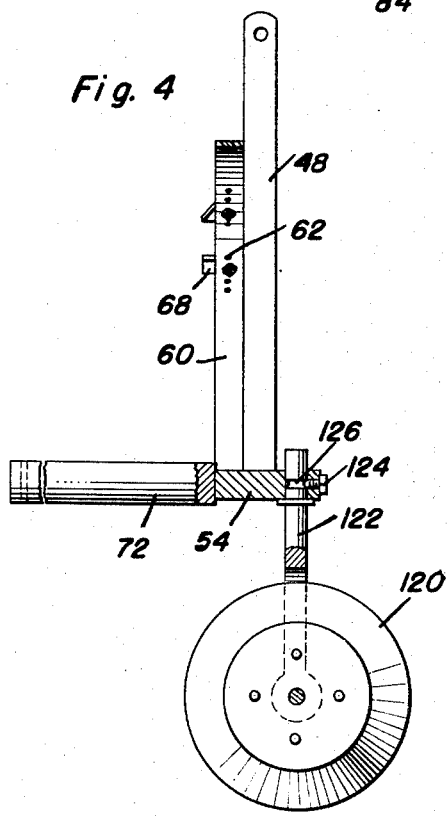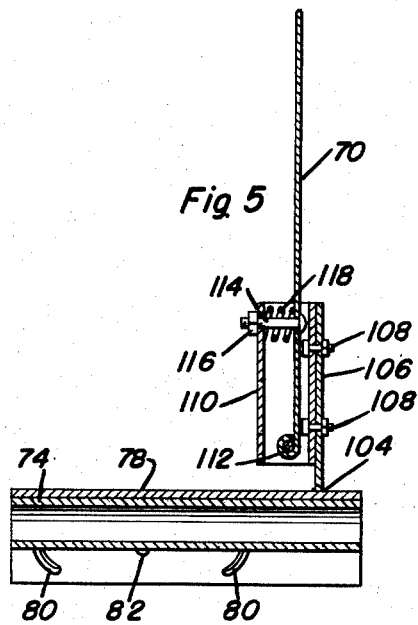

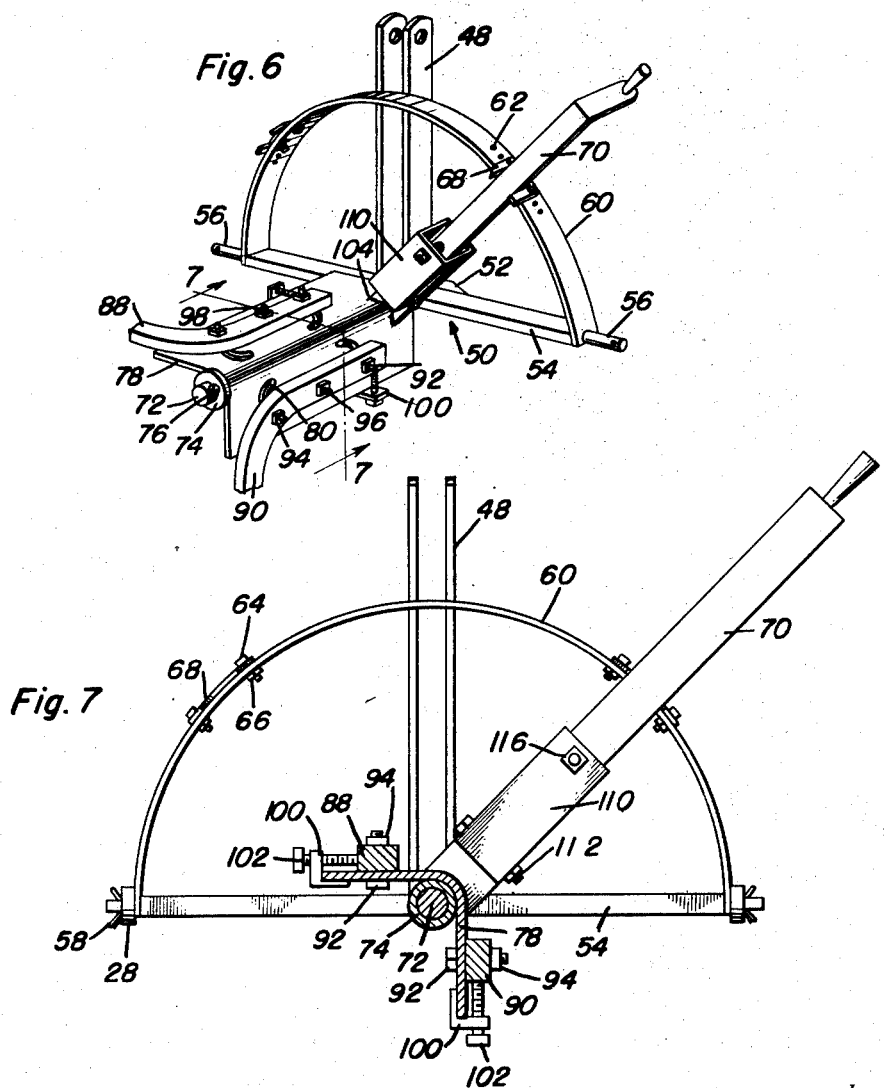

Patented Sept. 9, 1952

2,609,740

UNITED STATES PATENT OFFICE 2,609,740

REVERSIBLE TRACTOR PLOW

Walter A. Dexheimer, Jr., and Harold N. Pullen, Fort Morgan, Colo.

Application January 10, 1946, Serial No. 640,159

2 Claims. (Cl. 97—26)

This invention relates to plows and more particularly to a reversible plow adapted to be attached to a tractor and having two plow shares arranged for right hand and left hand operation so as to plow in each direction.

An object of the invention is to provide a reversible or right and left hand plow, the moldboards of which are mounted to swing on a longitudinal pivot and having a novel mounting construction and frame as well as control arm or a lever, so that when one of the moldboards is in the ground, and the tractor pulls the plow the length of the field, the operator upon turning the tractor around to proceed in the opposite direction, releases the control arm and the weight of the plow which is elevated pulls the control arm and plows to the opposite side, so that the previously raised plow is lowered into the ground and the previously arranged plow in the ground is elevated.

Other objects and advantages reside in the details of construction and operation as more fully hereinafter described and claimed, reference being had to the accompanying drawings forming part hereof, wherein like numerals refer to like parts throughout, and in which:

Figure 3 is a rear elevation showing the reversible plow arrangement detached from the tractor.

Figure 4 is a sectional side elevation on an enlarged scale showing the mounting of the rolling coulter or harrow disc, which rolls along in front of the plow.

Figure 5 is a vertical sectional view through the control lever and mounting means shown removed from the shaft.

Figure 6 is an enlarged fragmentary perspective view showing the mounting and adjusting means, and Figure 7 is a section taken on the line 7—7 of Figure 6.

Specific reference is now made to the drawings. In the several views in the accompanying drawings and in the following specification similar reference characters indicate corresponding elements throughout.

Figure 1:
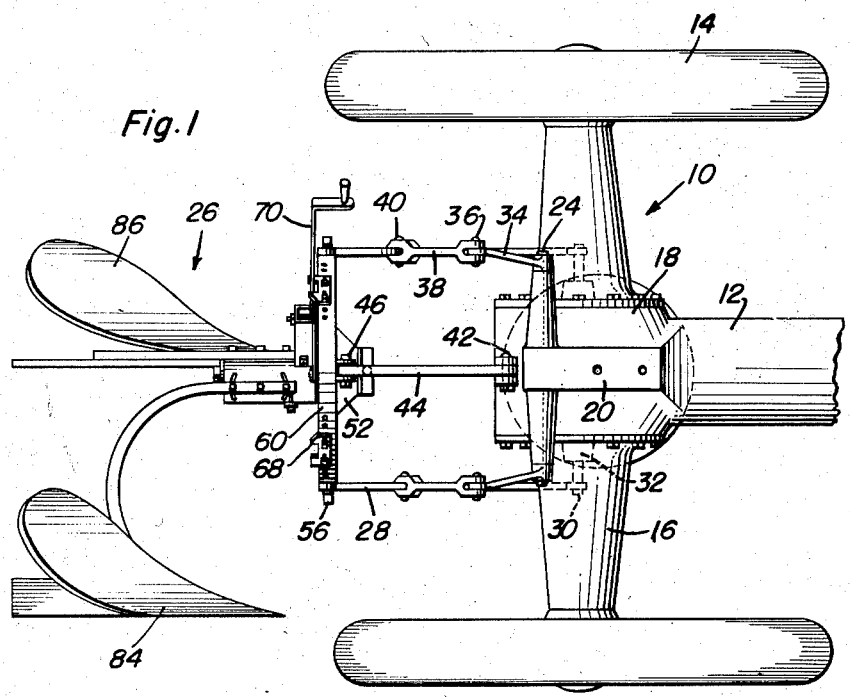
Figure 1 is a plan view of a reversible tractor plow constructed in accordance with the invention.
Figure 2:
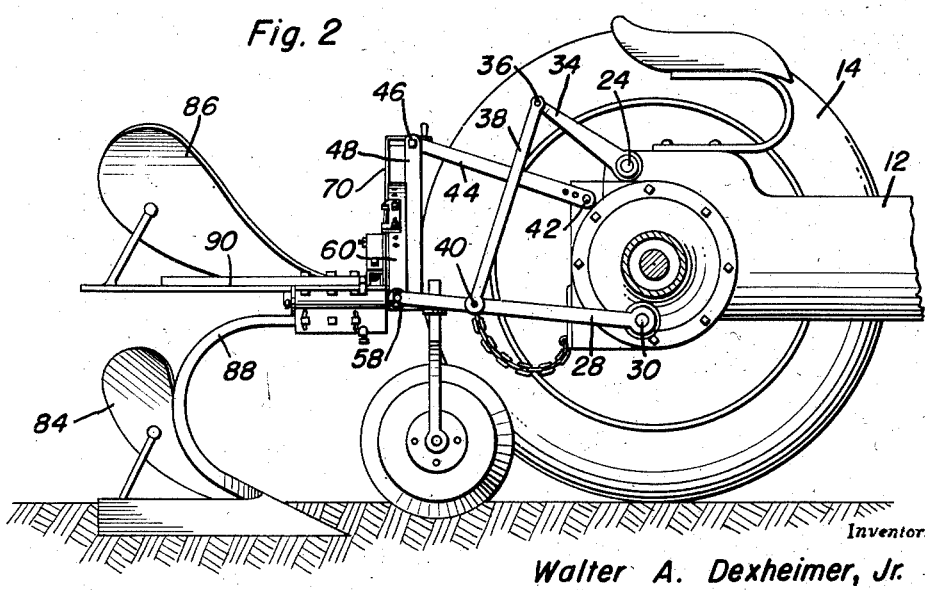
Figure 2 is a side elevation of the structure shown in Figure 1.

Indicated generally at 10 is a conventional tractor having a drive shaft housing 12, drive wheels 14 and a rear axle drive housing 16 secured to a differential housing 18. The tractor is further provided with a power lift means 20 having a movable member connected to a crank shaft 24 and operated by the power of the tractor engine in a well known manner.

The reversible plow of the present invention is indicated at 26 and includes a pair of drawbars or links 28 pivoted for vertical swinging movement on opposite sides of the differential housing as at 30 on suitable studs or bosses 32. Short arms 34 are secured at one of their ends to the crank shaft 24 and pivoted at their opposite ends as at 36 to the upper ends of arms 38 which are in turn pivoted as at 40 to the links 28. The links 28 are adapted to be raised and lowered by a connection to the power take-off as will be described hereinafter. Adjustably pivoted as at 42 to the upper rear portion of the differential housing 18 is a link 44 which is in turn pivoted as at 46 between the upper ends of a pair of spaced parallel upright bars 48. The upright bars are rigidly secured at their lower ends to the plow frame 50 and reinforced at the connection with the frame with appropriate webs or gussets 52.

The plow frame includes a transverse horizontal drawbar 54 securing the bars 48, the drawbar 54 including reduced ends 56 upon which are pivoted the links 28, the latter being retained thereon by suitable cotter pins 58. The transverse bar 54 secures an arcuate enlarged segment or bowed bar 60 provided with circumferentially spaced apertures 62 for adjustably receiving headed bolts 64 and closure nuts 66 for securing U-shaped catches or keepers 68 adapted to selectively hold an operating lever 70 to be described later. By means of the apertures 62, the bolts and nuts 64 and 66 and the keepers 68, the two positions of the operating lever 70 may be circumferentially adjusted on the segment bar 60 as will be readily apparent to those skilled in the art.

Rigidly secured at one of its ends centrally to the transverse bar 54 is a shaft 72 upon which is journaled a sleeve 74 held against longitudinal relative movement on the shaft by an appropriate key or pin 76. An inverted V-shaped plate 78 is welded or otherwise rigidly secured centrally to the sleeve to turn therewith on the shaft. Each of the arms of the V-shaped plate includes longitudinally spaced arcuate slots 80 and an aperture 82 therebetween.

The present device includes opposite and reversed moldboards 84 and 86 having beams 88 and 90 each of which may be adjustably secured upon each of the arms of the V-shaped plate. Headed bolts 92 extend through the slots 80 and each of the plow beams and receive closure nuts 94. A further headed bolt 96 extends through the aperture 82 and each of the plow beams and also receives a closure nut 98. An L-shaped lug 100 is secured to each arm of the V-shaped plate 78 adjacent one of the slots 80 and includes a set screw 102 threaded through one arm thereof and adapted to abut an edge of each of the plow beams. Thus when the nuts 94 and 98 are loosened, the set screw 102 may be turned to urge each plow beam to the desired angular position on each arm of the V-shaped plate, the plow beam pivoting about the central bolt 96. Retightening the nuts will retain the plow beams and moldboards in proper position on the V-shaped plate.

Welded as at 104 to the V-shaped plate 78 adjacent the transverse bar 54 is a bar 106, see Figure 5, which is in turn secured by appropriate bolts and nuts 108 to an open-ended substantially rectangular housing 110. A pin 112 is secured through the lower end of the housing and pivotally supports the lower end of the operating lever 70. A headed bolt 114 extends through the operating lever and one wall of the housing and is retained on the latter by an appropriate nut 116. A coil spring 118 is wound about the bolt 114 and is interposed between the said one wall of the housing and the operating lever urging the latter towards the segment bar 60.

A rolling coulter or disc 120 is mounted on a swivel pin 122 which extends through a suitable aperture in the transverse bar 54, there to be retained by a set screw 124 engaged in an annular groove 126 provided in the swivel pin, the coulter being adapted to operate with either the right or left-hand plow and cut up debris that may interfere with the plowing operation.

In the operation of the device, with the control lever 70 held in one of the keepers 68 of the segment bar 60, the tractor and plow proceed across a field to be plowed cutting a proper furrow. Assuming that the right moldboard will be in the ground and the tractor pulls the plow the length of the field, in turning around, the operator of the tractor before proceeding in the opposite direction, reaches back to the control or operating lever without leaving his seat and releases the control lever from the keeper which held the plow in position through the field. The weight of the plow that is elevated pulls the control arm to the opposite side of the segment bar at the same time raising the plow previously in the ground. The control arm then slides into the keeper 68 on the opposite side of the segment bar 60 and the plow proceeds in the opposite direction cutting the necessary furrow parallel to the previously cut furrow with the moldboard and plow share that were previously held in the air lowered to plow depth ready for the plowing operation in the opposite direction from the previous run. In this way, the reversing action provides a hill side or two-way type of plow especially adapted for tractors and movable on a longitudinal axis so that one plow is swung into operation with the corresponding movement of the other plow out of operation. The reversing operation is accomplished in a simple manner assisted by the turning of the tractor and plow, especially with a very abrupt turn. The adjustable mounting for the plows permits the same to move to the exact position desired, which may be adjusted by the adjusting means described so that the furrow will be cut the proper depth in connection with plow shares and moldboards of different sizes. The device will operate two ways, instead of in a single way, thereby saving considerable time in cutting furrows or requiring to start at one end of the field instead of at both ends.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what is claimed is:

1. A reversible plow comprising a frame having a horizontal transverse bar and a vertically extending segment bar mounted thereon, a longitudinal shaft rigidly secured at one of its end centrally to said transverse bar, a sleeve journaled on said shaft, an elongated V-shaped plate secured centrally along its length upon said sleeve, a pair of plows having plow beams, means for adjustably retaining each plow beam on each arm of said V-shaped plate, a pair of keepers, means for securing said keepers in spaced circumferentially adjusted positions on said segment bar, a housing secured to said V-shaped plate, a vertically extending operating lever pivoted in said housing, resilient means urging said lever towards said segment bar and into engagement with one of said keepers, and means for adjustably hitching the ends of said transverse bar to a prime mover, one of said plows being retained in a position elevated from the ground while the other plow is automatically retained in a ground-engaging position when said operating lever is selectively engaged in one of said keepers.

2. The combination of claim 1 wherein said hitching means includes a pair of spaced parallel uprights secured upon said transverse bar and an adjustable link pivoted at one of its ends between the upper ends of said uprights and adapted to be adjustably secured at its other end to a prime mover.

WALTER A. DEXHEIMER, Jr.
HAROLD N. PULLEN.

REFERENCES CITED

The following references are of record in the file of this patent:

UNITED STATES PATENTS

| Number | Name | Date |
|---|---|---|
| 267,630 | Witt | Nov. 14, 1882 |
| 332,301 | Strait | Dec. 15, 1885 |
| 332,302 | Strait | Dec. 15, 1885 |
| 358,180 | Willson | Feb. 22, 1887 |
| 808,727 | Connor | Jan. 2, 1906 |
| 1,889,097 | Ledoux | Nov. 29, 1932 |
| 2,223,002 | Ferguson | Nov. 26, 1940 |
| 2,336,410 | McKay | Dec. 7, 1943 |
| 2,364,367 | Janke | Dec. 5, 1944 |
| 2,366,281 | Mott | Jan. 2, 1946 |

FOREIGN PATENTS

| Number | Country | Date |
|---|---|---|
| 875,681 | France | June 29, 1942 |